(12) United States Patent
Irving et al.

(10) Patent No.: US 8,196,120 B2
(45) Date of Patent: *Jun. 5, 2012

(54) COMPUTER EMULATOR EMPLOYING DIRECT EXECUTION OF COMPILED FUNCTIONS

(75) Inventors: Michael James Irving, Mission Viejo, CA (US); Robert Joseph Meyers, Garden Grove, CA (US)

(73) Assignee: Unisys Corporation, Blue Bell, PA (US)

( * ) Notice: Subject to any disclaimer, the term of this patent is extended or adjusted under 35 U.S.C. 154(b) by 823 days.

This patent is subject to a terminal disclaimer.

(21) Appl. No.: 12/333,864

(22) Filed: Dec. 12, 2008

(65) Prior Publication Data

US 2009/0094015 A1 Apr. 9, 2009

Related U.S. Application Data

(63) Continuation of application No. 10/170,053, filed on Jun. 11, 2002, now Pat. No. 7,506,321.

(51) Int. Cl.
*G06F 9/45* (2006.01)

(52) U.S. Cl. .......................................... 717/138; 703/26

(58) Field of Classification Search ........................ None
See application file for complete search history.

(56) References Cited

U.S. PATENT DOCUMENTS

| | | | | |
|---|---|---|---|---|
| 5,077,657 A * | 12/1991 | Cooper et al. | ................... | 703/26 |
| 5,210,832 A * | 5/1993 | Maier et al. | ................... | 712/227 |
| 5,361,344 A * | 11/1994 | Beardsley et al. | ............... | 703/23 |
| 5,432,935 A * | 7/1995 | Kato et al. | ................... | 719/320 |
| 5,664,098 A * | 9/1997 | Bianchi et al. | ................... | 726/16 |
| 5,751,982 A * | 5/1998 | Morley | ................... | 712/209 |
| 5,781,758 A * | 7/1998 | Morley | ................... | 703/23 |
| 5,896,522 A * | 4/1999 | Ward et al. | ................... | 703/23 |
| 5,956,510 A * | 9/1999 | Nicholas | ................... | 717/137 |
| 5,966,515 A * | 10/1999 | Alferness | ................... | 703/21 |
| 6,128,679 A * | 10/2000 | Beale et al. | ................... | 710/62 |
| 6,141,635 A * | 10/2000 | Paul et al. | ................... | 703/22 |
| 6,351,782 B1 * | 2/2002 | Eaves | ................... | 710/72 |
| 6,457,171 B1 * | 9/2002 | Mann et al. | ................... | 717/138 |
| 6,463,582 B1 * | 10/2002 | Lethin et al. | ................... | 717/158 |
| 6,480,952 B2 * | 11/2002 | Gorishek et al. | ............... | 712/227 |
| 6,516,295 B1 * | 2/2003 | Mann et al. | ................... | 703/26 |
| 6,529,862 B1 * | 3/2003 | Mann et al. | ................... | 703/26 |
| 6,907,519 B2 * | 6/2005 | Desoli | ................... | 712/227 |

* cited by examiner

*Primary Examiner* — Anna Deng
*Assistant Examiner* — Adam R Banes
(74) *Attorney, Agent, or Firm* — James E. Goepel (57) ABSTRACT

An emulation system that provides the functionality of an emulated computer on a host computer pre-processes the object code file to be emulated to reduce the run-time overhead due to parsing the object code. The emulator uses pre-programmed functions that model each instruction of the emulated computer. An object code file is pre-parsed to generate a translated file which includes a sequence of function calls corresponding to the sequence of instructions in the code file. The translated file is compiled to generate a corresponding translated object-code file. The translated object-code file is executed in the emulation environment on the host computer. The emulation system also includes a standard mode in which the object code file is emulated by sequentially parsing each instruction in the object code file and invoking an appropriate one of the preprogrammed functions in the emulated environment.

21 Claims, 5 Drawing Sheets

COMPUTER EMULATOR EMPLOYING DIRECT EXECUTION OF COMPILED FUNCTIONS

This patent application is a continuation of, and claims priority to, U.S. patent application Ser. No. 10/170,053 filed Jun. 11, 2002, now U.S. Pat. No. 7,506,321 which is hereby incorporated herein by reference in its entirety.

FIELD OF INVENTION

This invention relates generally to computer emulation, and more particularly to a system and method for providing high speed emulation of a computer system by translating object code to equivalent high level language constructs and compiling the translated constructs for direct execution.

BACKGROUND OF THE INVENTION

A considerable amount of software has been written since digital computers were first used commercially. Much of this software, at least in its object code form, is not compatible with modern computing platforms, such as the Intel/Microsoft and Macintosh platforms which are increasingly used in commercial environments. This software, however, represents a significant investment for the companies that own it. As the computers for which this software was written become older and less reliable, these companies are faced with the task of recreating the functionality of these older programs in software that is compatible with modern-day platforms. While the cost of this effort may be justified for important software that is used in the day-to-day operations of a business, it may not be justified for less-important software.

One solution for handling this less-important software is to run it on an emulator for the older computer system. An emulator is a program configured to run on a modern-day platform that emulates the instruction set and architecture of another computer. In addition to the scenario for emulating legacy machines described above, there are various other reasons for emulating a computer system, including testing, or debugging, the program code associated with a computer system that is not physically available or which is difficult to program directly, for example, an embedded processor, or for evaluating different designs of a prospective computer system. To avoid confusion, in the materials that follow, the computer being emulated is referred to as the emulated computer or emulated system and the computer which is executing the emulation program is referred to as the host computer.

Computer emulation programs typically operate as interpreters. They fetch the object code of the computer to be emulated one instruction at a time and then perform functions equivalent to the fetched instruction on the host computer. The emulation program also includes data structures and a special-purpose operating system or enhancements to the operating system of the host computer that model the operating environment of the emulated computer.

Emulation of one computer architecture on another computer is inherently slow. Typically, an emulated program runs five or more times slower when compared to the same program running in the native mode of the host computer. Because, however, modern computers typically run programs much faster than legacy computers, there may be little or no difference in the execution of the emulated program on a high-speed modern computer and the original program on the emulated computer.

It is desirable, nonetheless, to provide an emulator which more efficiently models the emulated computer than a conventional interpretive emulator.

SUMMARY OF THE INVENTION

The present invention is embodied in an emulation system that pre-processes the object code file to be emulated to reduce the run-time overhead due to parsing the object code. The exemplary embodiment of the invention uses pre-programmed functions that model each instruction of the emulated computer. An object code file is pre-parsed to generate a translated file which includes a sequence of function calls corresponding to the sequence of instructions in the code file. The translated file is compiled to generate a corresponding translated object-code file. The translated object-code file is executed in the emulation environment on the host computer.

According to one aspect of the invention, the translated file includes a construct by which, after each instruction is executed, computer instructions corresponding to an interrupt handler of the emulated computer are executed.

According to another aspect of the invention, the object code file is divided into segments and each segment is either an unmodified segment of the object code file or a translated object-code segment. The exemplary emulator parses and executes the instructions of the unmodified segments and directly executes the translated object-code segments.

According to yet another aspect of the invention, the pre-programmed functions are imbedded in library routines and the translated file includes a switch statement that comprises a sequence of calls to ones of the functions corresponding to respective instructions in the object-code file. The individual calls to the library routines in the switch statement have addresses corresponding to the address of the respective instruction in the corresponding object-code segment. Each function performs the function of the emulated instruction and updates a program counter value.

DETAILED DESCRIPTION OF THE INVENTION

The inventors have determined that a significant source delay in a conventional interpretive emulator is in parsing of the object code file. Parsing is the process of fetching and deciphering the next instruction from the object code file of the program being emulated. This process typically accounts for thirty to forty percent of the processing time within the emulator.

An emulator desirably models the operation of the emulated computer exactly. The exemplary emulated computer, for example, allows an object code stream to be interrupted at any point and to resume execution at a later time. In addition, the emulator desirably allows execution of the emulated object code to begin at any arbitrary point, supports function calls and both static and dynamic branching.

One way to reduce the execution time of an emulated program is to reduce the time used to parse the object code file. The subject invention pre-processes the object-code file into an equivalent code file in a high-level language that may be compiled and executed on the host computer. This equivalent code file includes each of the instructions in the original object-code file as a separate statement in the high-level language. In one embodiment of the invention, the function statements are case statements in a C++ switch statement. Each case statement is addressed by its corresponding address in the object code file. This simplifies the handling of branch statements and interrupts and allows both translated and un-translated object code files to be executed by the same emulator program.

Figure 1:
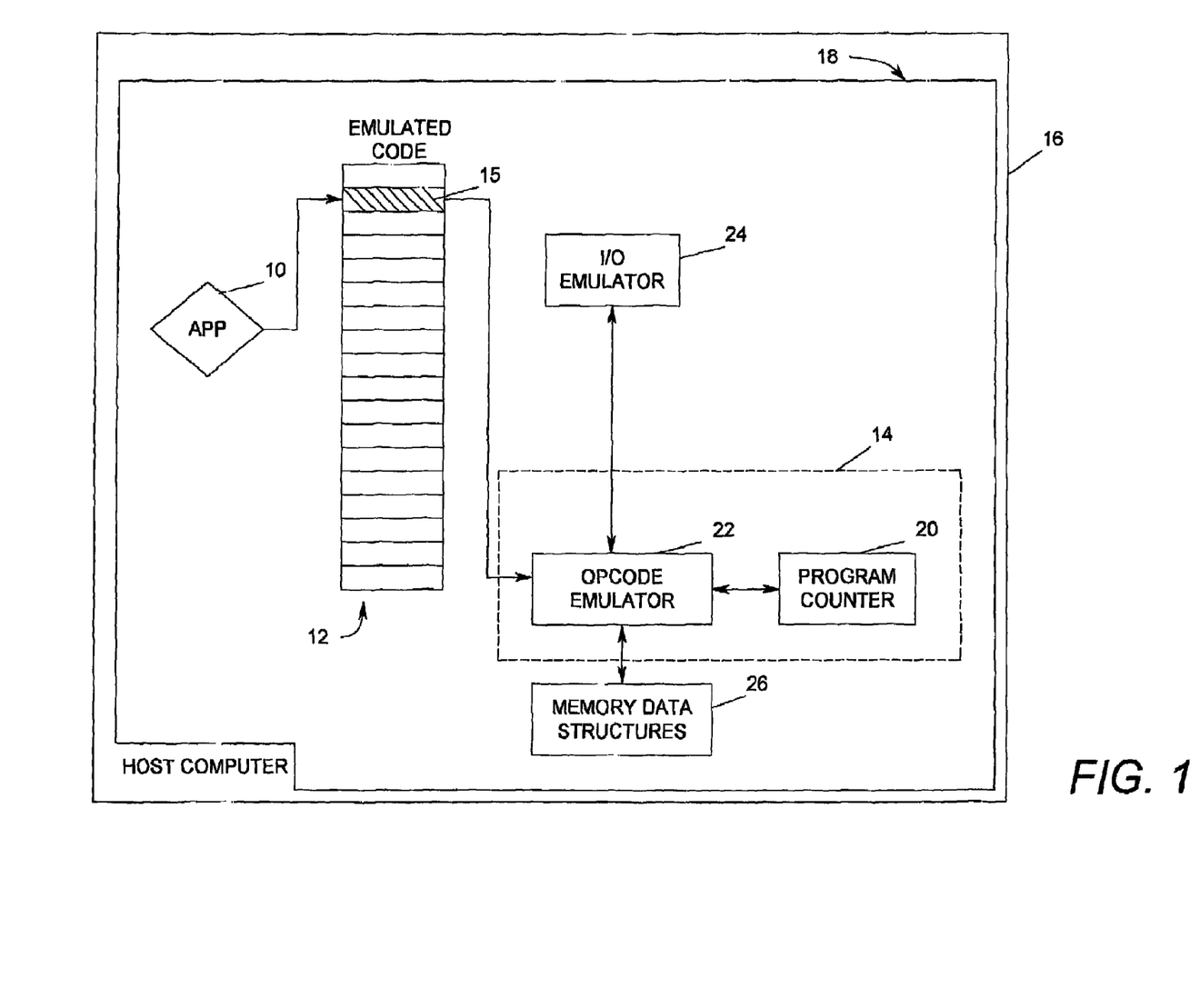
FIG. 1 (prior art) is a block diagram of a conventional software emulation system.

FIG. 1 is functional block diagram which is useful for describing the operation of a software emulator 18 according to the subject invention operating in its standard mode. The emulator 18 includes a processor emulator 14, an input/output (I/0) emulator 24 and one or more data structures 26 which model the memory environment of the emulated computer. The processor emulator 14 includes a program counter 20 and an operation code (opcode) emulator 22. The emulator 18 is itself a program system executing on the host computer 16. Depending on the implementation, the emulator 18 may be an application program running in an operating system environment (e.g. Microsoft Windows, Linux, etc.) or it may be a stand-alone program that includes any operating-system functionality that it needs to control the host computer 16.

The present invention is described in terms of an exemplary system that emulates a Unisys A-series computer on an host computer including an Intel microprocessor and a Microsoft Windows operating system. The A-series computers are stack machines while the Intel microprocessors are general register machines having a stack that is used only for procedure calls. Each instruction in the A-series architecture may include one or more syllables. The first syllable is the opcode and the remaining syllables are parameters for the instruction. The number of bytes in the code segment that are used by an instruction may be determined from its opcode. In the A-series architecture, object code files are stored in segments and addressed using a segment address. The segment address is a triplet, including a segment number, a word index in the segment and a byte index in the word. Each individual instruction can be addressed by a segment address code pointer, allowing a program to be interrupted after any instruction and to resume execution at any instruction in the segment.

In the exemplary embodiment, an object-code segment 10 which is written for an emulated computer is first loaded into system memory 12 of the host computer 16. The opcode emulator 22 of the processor emulator program 14, accesses an instruction 15 in the object-code 10 as the next instruction to be executed. This instruction is determined by the current value in the program counter 20 of the processor emulator program 14. The opcode emulator 22 indexes a table of function pointers (not shown) and calls the function which emulates the function of the instruction 15 in the emulated computer.

The emulator program 14 models the current state of the emulated computer and, so, includes results from previously executed instructions. The results of the previously executed instructions may also affect the actions performed by the host computer 16 to emulate the function of the instruction 15. The host computer 16 then performs the actions, updating the state of the system including the program counter 20.

The exemplary emulation program 14 determines which operations to perform in the host-computer environment by parsing individual instructions in the object-code file 10. This is done at run time (execution) of the emulator program and, as described above, accounts for much of the overhead of the emulated system.

Figure 2:
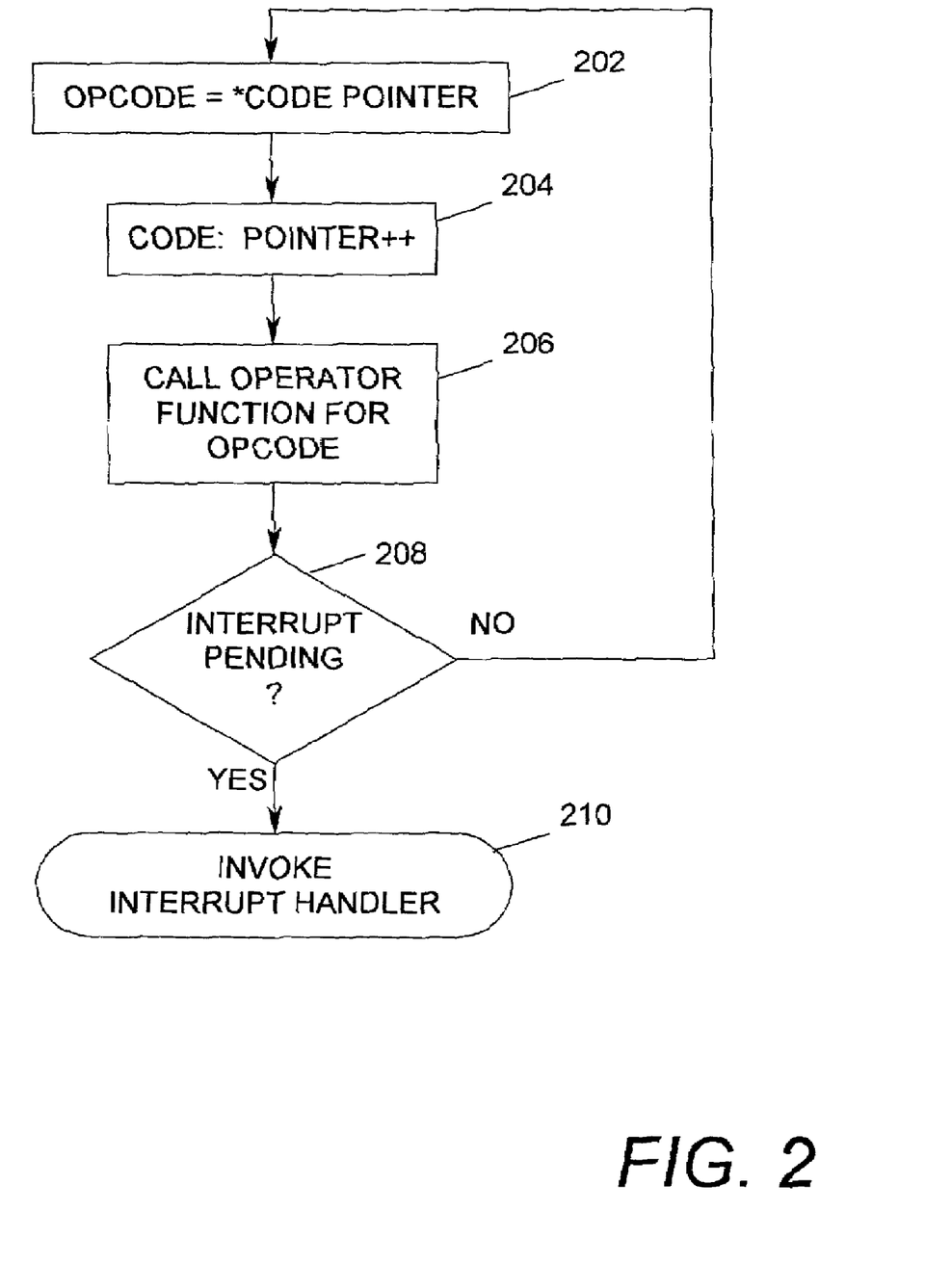
FIG. 2 (prior art) is a general flow diagram of parsing loop of a conventional software emulation system.

FIG. 2 is a flow chart diagram of an exemplary parsing loop for the emulator program 14, shown in FIG. 1. At step 202, the process determines the location of the next instruction 15 in the object-code by accessing the location in the memory 12 indicated by the variable CODE_POINTER (i.e. the current value of program counter 20). As described above, the exemplary program counter, emulating a Unisys A-series computer maintains a segment address in the program counter 20.

The target instruction is stored into the variable OPCODE at step 202. Next, at step 204, the program counter is incremented so that CODE_POINTER points to a position in the object code after the opcode value for the instruction. At step 206, the process determines which operator function in the emulator is to be invoked to emulate the retrieved instruction in the variable OPCODE and invokes that operator to perform the associated function. After the instruction has been emulated, the process, at step 208 determines if any interrupts are pending. If they are, at step 210 the process invokes the interrupt handler. In the exemplary embodiment of the invention; the interrupt handler is a part of the operating system for the emulated computer and may be emulated as a part of the emulator program 18.

Figure 3:
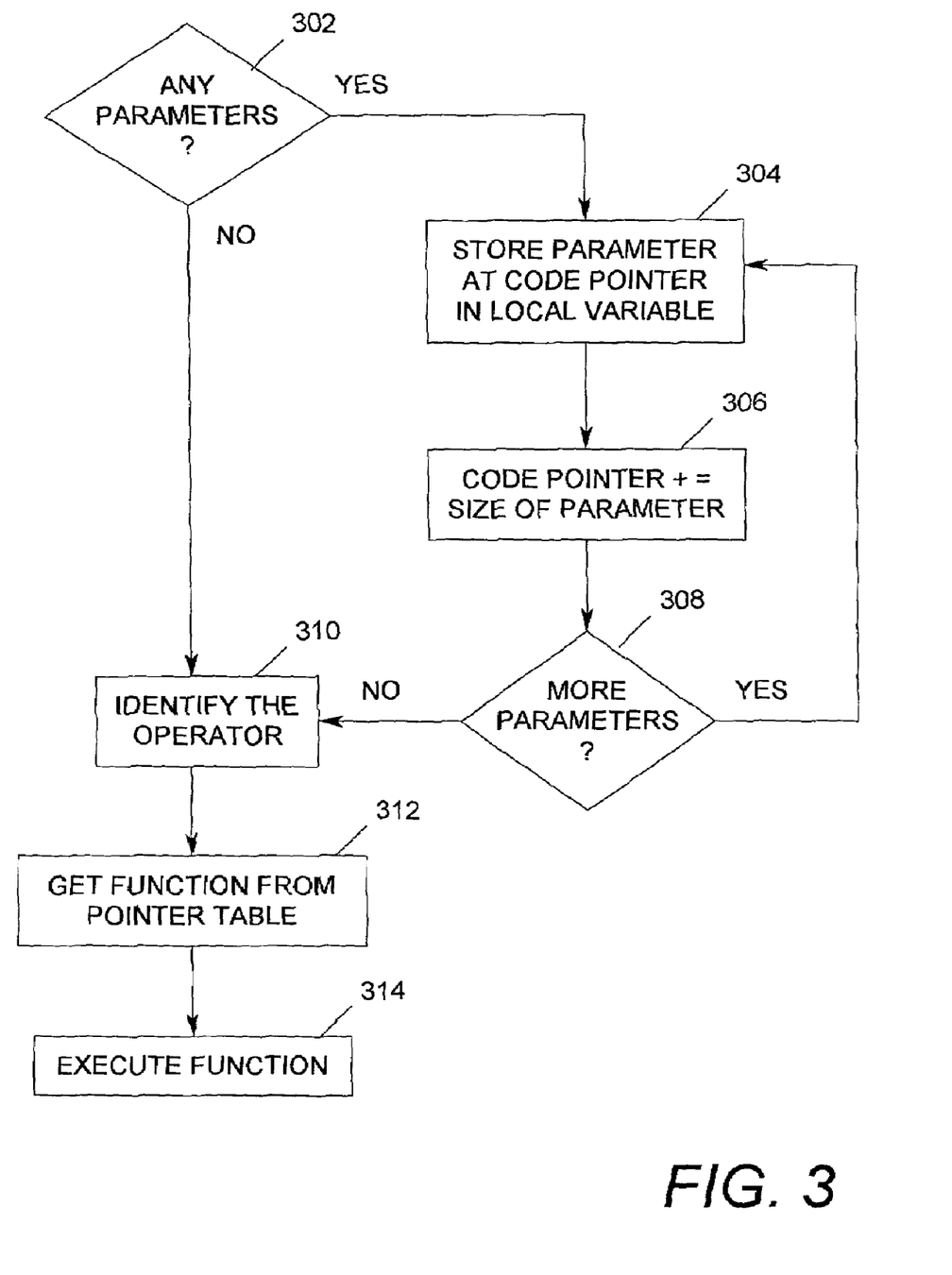
FIG. 3 (prior art) is an expanded flow chart of the process "Call Operator Function."

FIG. 3 is an expanded flow chart of the step Call Operator Function 22, shown in FIG. 2. Once the instruction 15 to be emulated is loaded into the variable OPCODE, step 302 determines if the instruction has any parameters associated with it. For example, a fetch instruction may have the memory address of the data value to be fetched as a parameter. If the instruction has parameters then, at step 304, the data value at the address in memory 12 indicated by CODE_POINTER is stored into a local variable 32. At step 306, the value in CODE_POINTER is incremented by the size of the parameter and, at step 308, the process determines if the instruction has additional parameters. If it does, control transfers to step 304, described above, to fetch the next parameter from the object code and store it into a respective local variable. Steps 304, 306 and 308 are repeatedly executed until the last parameter associated with the instruction 15 has been processed.

When the last parameter has been processed at step 308 or after step 302 if no parameters were associated with the instruction 15, step 310 is executed which identifies the instruction 15. This step assigns an index value into the pointer table based on the value of OPCODE. At step 312, the function to be executed to emulate the operation is identified from an entry in pointer table corresponding to the identified instruction 15. Finally, at step 314, the identified function is executed to emulate the instruction 15.

Step 314 of FIG. 3, Execute the Function, represents the invocation of an operator function corresponding to a specific instruction for the emulated computer. The subject invention differs from most emulators in that it defines a separate operator function for each instruction and commonly occurring group of instructions on the emulated computer. In the exemplary embodiment of the invention, the name of each operator function in the standard emulation mode has a form "<operator name>_common" (e.g. ADD_common for the ADD instruction).

Figure 5:
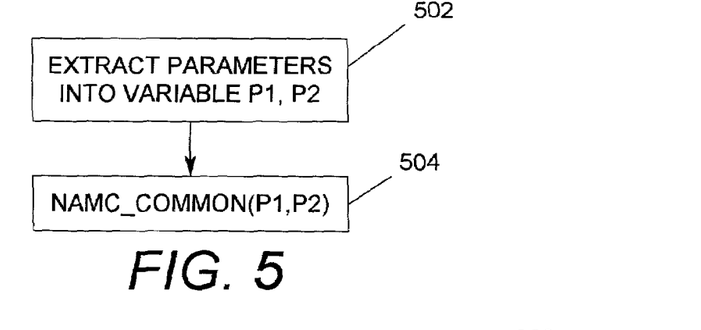
FIG. 5 is an example of how the an exemplary instruction is restructured into a callable operator.

FIG. 5 is an example of how an operator is structured into a operator function. In this example, at step 502, the two parameters for the NAMC instruction are extracted from the code stream and assigned to local variables p1 and p2. Next, at step 504, the NAMC_common operator function is invoked to implement the function of the NAMC operator on the host computer.

Figure 4:
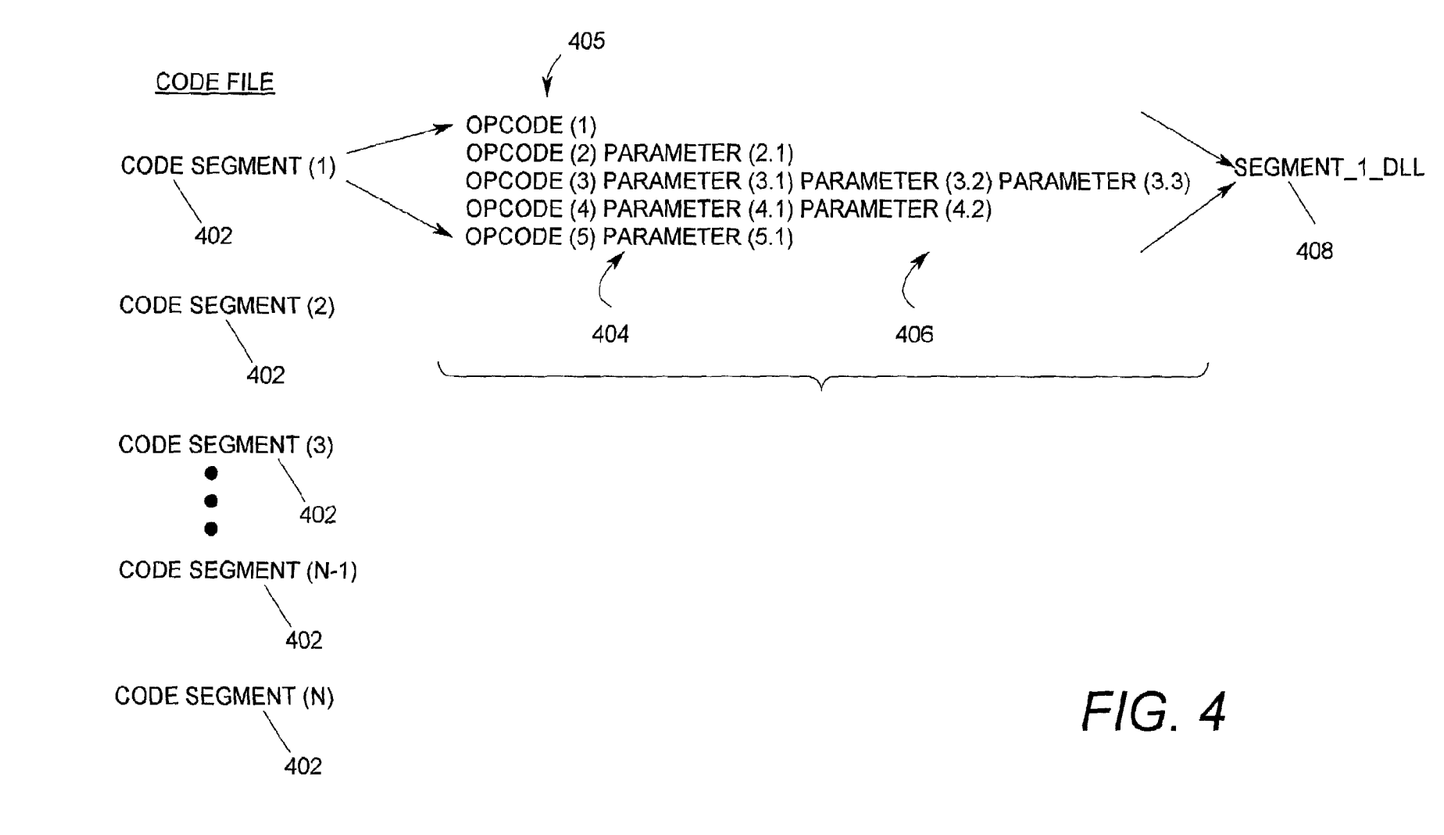
FIG. 4 is a code translation diagram showing how the code file is separated into Code Segments.

In addition to the standard emulation mode, described above, the present invention defines a DLL emulation mode that eliminates most of the instruction parsing performed in the run time emulator operating in its standard mode. Each segment 10 of the object code to be emulated is first translated into a function written in a high-level language. In one exemplary embodiment of the invention, this function is in a C++ dynamically linked library (DLL) file. A master emulator program, consisting of a sequence of these function calls and corresponding to multiple program segments, is compiled and is then executed by the host computer 16, in the emulator environment, instead of parsing the object-code file 10 through the processor emulator 14. This operation essentially transfers the parsing of the instructions in the object code file to a compile time operation, substantially reducing the run-time parsing operations. A mark is placed in each code segment once it has been translated. Thus, as the emulator encounters each segment in the object code file 10, it knows whether the segment is to be emulated using the standard emulation techniques, described above, or the DLL emulation mode, described below.

In the DLL mode of operation, each code segment of the source code to be emulated becomes a function in a DLL. Each function in the DLL is a sequence of a high level language function calls to operator functions which emulate the operators of the emulated computer. These operator functions with the parameters passed, if any, are abstracted from the code file.

The operation of the exemplary embodiment of the invention is illustrated by the use of a small object-code program for the A-series computer. This code segment increments a value in a variable J by 1 and stores the result into a variable I, as shown in equation (1).

$$I=J+1 \qquad (1)$$

The object code stream for the A series computer would be

... 1002B1805003B8 ...

The functions performed by this code stream are illustrated in Table 1.

processor 410. The code segments are composed of instructions 404, each including an opcode 405 and its respective parameters 406. Each of the Code Segments is complied into a respective function in a DLL 408.

An exemplary DLL having a segment function which includes the code segment described above is shown in Table 2.

TABLE 2

```
x_Return_Type_Segment_001 (entrypoint)
{
    switch (entrypoint)
    {
        .
        .
        .
        case 123: x_VALC(2,2);
        case 125: x_ONE( );
        case 126: x_ADD( );
        case 127: x_NAMEC(2,3);
        case 129: x_STOD( );
        .
        .
        .
    }
}
```

As shown in Table 2, the preprocessor 410 translates each of the instructions in the code segment into C++ functions having names of the form x_<operator name> (<parameter list>).

The various operator functions in the switch statement are accessed by their address in the case statement. The case address, in turn, is determined from the segment address of the instruction. As described above, the segment address is a triplet including a segment number, a word within the segment and a byte within the word. In the exemplary embodiment of the invention, each code segment is translated into a separate function within a DLL that includes functions for all of the segments in the code file. In a particular exemplary DLL, the various segment functions are named Segment001, Segment002, ... etc. and are called directly from the emulator.

TABLE 1

| Machine Code | Assembly Language | Comment | Entry point case values | Corresponding Function within code segment DLL |
|---|---|---|---|---|
| ... | ... | ... | ... | ... |
| 1002 | VALC(2, 2) | Fetch the value at stack location 2 (i.e. J) to the top of the stack | 123 | x_VALC (2,2) |
| B1 | ONE: | Put the literal value 1 (one) on top of the stack | 125 | x_ONE( ) |
| 80 | ADD: | Add the two items on the top of the stack leaving the result on the stack | 126 | x_ADD( ) |
| 5003 | NAMC(2, 3) | Put a reference to stack location 3 (i.e. I) on top of the stack | 127 | x_NAMC (2,3) |
| B8 | STOD | Store the location referenced at the top of the stack and decrement stack pointer | 129 | x_STOD( ) |
| ... | ... | | ... | ... |

FIG. 4 is a code translation diagram showing how the source code file is separated into code segments 402 and how the segments are translated to functions in a DLL by a pre- The exemplary embodiment of the invention translates the word index and byte index portions of the segment address into an entry point value (i.e. the variable "entrypoint" in Table 2). In the exemplary embodiment, this is done by multiplying the word address by eight and adding the byte address. Thus, there is a different entry point value for each byte in the segment. As an example, a segment address of 1234:56:3 (i.e. segment 1234, word 56, byte 3) translates to segment 1234, entry point 451 (56*8+3). The exemplary emulator 14 includes program instructions that translate segment addresses into entry points when processing a translated DLL code segment and which translate entry points to segment addresses when switching from processing a translated DLL code segment to processing an un-translated object code segment. When beginning execution of a segment, the emulator passes the entry point of the first operator to be executed as a parameter to the segment function.

Figure 6:
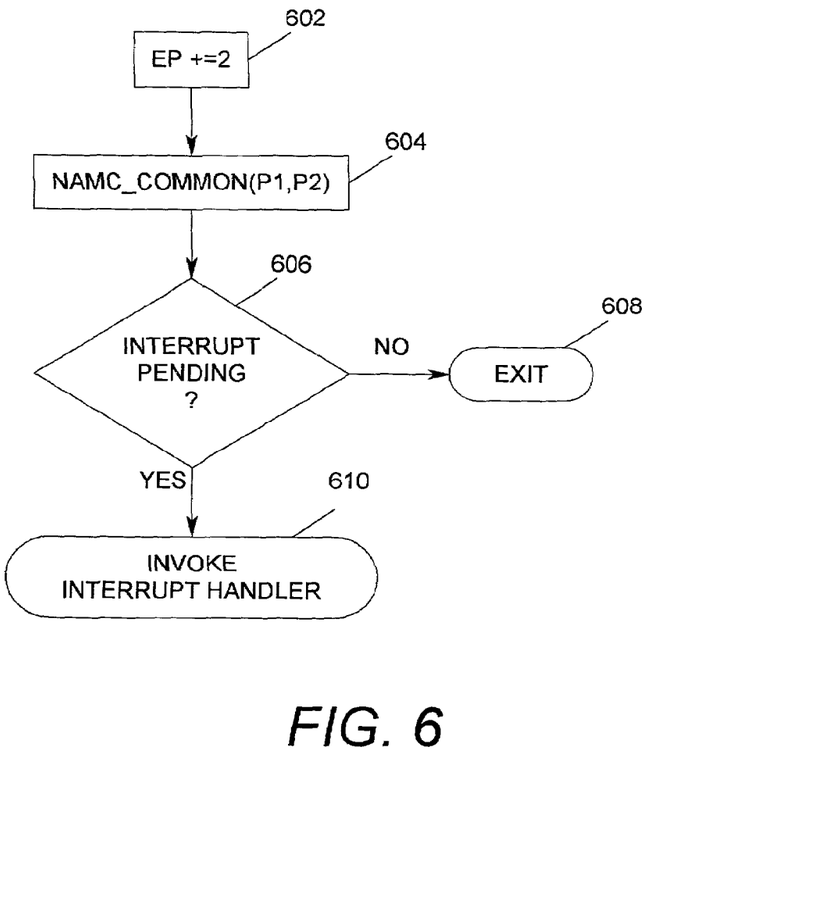
FIG. 6 shows an exemplary structure of a function that emulates the NAMC operator.

FIG. 6 is a flow-chart diagram that provides an example of how the NAMC instruction is structured into a callable operator function. This example, shows an exemplary implementation of the x_NAMC(p1,p2) function which emulates the NAMC instruction.

When the x_NAMC operator function is called, the Entry Point (EP) variable is incremented by 2 at step 602 of FIG. 6. This step spaces the entry point past the two syllables that constitute the NAMC instruction and its parameter. Next, at step 604, the emulator function NAMC_common is invoked. After step 604, the operator function determines if any interrupts are pending. If so, then at step 610, the function invokes the interrupt handler. If no interrupts are pending then, at step 608, the operator function returns control to the segment function that called it.

As described above, the Entry Point variable is the equivalent of code index used in the standard emulation mode. Code indexes are not only embedded in code files but are also used by the systems software. It is therefore desirable to frequently convert entry points to and from code indexes.

Maintaining the Entry Point variable is desirable for the proper operation of the system. In the exemplary embodiment of the invention, even when the DLL is in the midst of a series of sequential operators and an interrupt occurs, the Entry Point value is preserved and maintained.

Besides being concerned with interrupts, other occurrences can disrupt the sequential execution of operators. The most common are branches. The emulator supports conditional and unconditional branching to static (fixed at compile time) or dynamic (calculated at compile time) destinations.

Static branches are always within the same code segment, and the high level language can do a simple GOTO operation branching to the opcode address appropriate for the branch. For example, the instruction BRFL (code location) branches to the segment address "code location" if the item on the top of the stack is false otherwise execution continues to the next operator, exemplary code in the segment function of the DLL may be:

if x_BRFL (178) goto L178;

The X_BRFL operator function evaluates the item on top of the stack. If it is true, Entry Point is incremented to space past the opcode and the parameter, and the operator returns FALSE. If the top-of-stack item is false, the operator sets the EP to 178 and returns TRUE, causing the segment function to execute a goto operation, branching to a label L178 (i.e. case 178 in the segment function).

Dynamic branches may branch outside the current code segment. In this case, the segment procedure exits back to the emulator, so that a different segment procedure can be called. The segment procedure containing the dynamic branch may, for example, return a value indicating that a dynamic branch operation should be performed. The item on top of the stack after control is returned to the DLL is evaluated to determine the new segment number and entry points so the appropriate segment function call can be made.

Another potential break in sequential execution may occur when a procedure call is encountered. As with the dynamic branch, the segment function exits back to the emulator, this time returning a value that indicates an ENTR operation needs to be performed. The exemplary emulator 14 forms a Return Control Word RCW) containing a code index be constructed and left on the stack to indicate the entry point immediately after the procedure call in the segment function. This entry point is used to resume execution of the program after the called procedure has completed. The emulator uses the Entry Point value to construct the RCW before changing the Entry Point value to the entry point for the called procedure.

The exit from a called procedure is handled similarly. Upon encountering an exit (EXIT) or return (RETN) operator, the segment function for the called procedure exits back to the emulator with an appropriate return value. The emulator executes the operator, which uses the RCW to calculate the segment number and entry point in the segment that called the procedure. The emulator then calls the appropriate segment function, placing the value returned from the called procedure on top of the stack, and execution resumes.

The process of transcribing a code file is an opportunity to make other changes to the code. One effective technique is to concatenate operators. Creating a new operator is simply a matter of defining a new "x" operator function and invoking it from the C++ program. Many operations can be optimized through creating new operators.

For example: the sequence VALC (p1, p2), ONE( ), ADD( ) that fetches a value at location p2 of level p1 in the stack, increments it by one and leaves the result on top of the stack. If this group of operators occurs frequently in a single program or in many programs, it may be desirable to define a composite operator function: x_VALC_ONE_ADD (p1, p2) which combines the operator functions to produce the same result without incurring the overhead of function calls and returns from the C++ program. It may be desirable, however, to check the interrupt status after each of the component operator functions (e.g. VALC_common, ONE_common and ADD_common) to ensure accurate emulation.

The invention has been described as using C++ functions and libraries to implement the transformed code files. It is contemplated, however, that other, similar constructs may be used. Many computer languages include functions, subroutines or procedures that may be used in place of the C++ functions and DLLs. In addition, these same languages include switch statements, case statements or other similar constructs. To effectively implement the data sharing that allows the segment functions to operate in the data environment of the emulator 14, it may be desirable to use an object-oriented language.

While the invention is described in terms of an emulator program running on a host computer, it is contemplated that the program may reside on a computer-readable carrier such as a magnetic memory card, optical or magnetic disc or a radio-frequency or audio-frequency carrier wave.

While the invention has been described in terms of an exemplary embodiment, it is contemplated that it may be practiced as outlined above with modifications within the scope of the appended claims.

The invention claimed is:

1. A method for emulating the functionality of an emulated computer on a host computer by executing a plurality of object-code instructions for the emulated computer on the host computer, the method comprising:

providing a plurality of preprogrammed emulation functions that implement individual instructions of the emulated computer on the host computer in an emulated operating environment of the emulated computer;

pre-parsing the object-code instructions prior to run-time, the pre-parsing comprising generating equivalent high level translated functions for any object-code instructions for which a corresponding preprogrammed emulation function does not exist and compiling the high level translated instruction into corresponding object-code instructions suitable for execution on the host computer;

executing the unmodified object-code instructions on the host computer by sequentially parsing each instruction and invoking a corresponding preprogrammed emulation function provided on the host computer; and, directly executing any object-code instructions produced during the pre-parsing.

2. The method of claim 1 further comprising invoking an interrupt handler to process any pending interrupts.

3. The method of claim 1 further comprising placing a mark in the object-code instructions produced during the pre-parsing, the mark identifying the object-code instructions as containing a translated instruction.

4. The method of claim 3, further comprising:
maintaining a first address pointing to an address of the next object-code when object-code having an unmodified instruction is executed;
maintaining an entry point address pointing to a next function to be executed when object-code having a translated instruction is executed; and,
translating between the entry point address and the first address in response to a transition between executing object-code having an unmodified instruction and executing object-code containing a translated instruction.

5. The method of claim 4, further comprising embedding the translated instructions in a library routine, wherein the library routine includes a switch statement that comprises a sequence of calls to ones of the functions corresponding to the object-code instructions and wherein the individual calls to the functions in the switch statement have addresses corresponding to the entry point address of the respective instruction in the corresponding plurality of object-code instructions.

6. The method of claim 5, the library routines being provided in a dynamically linked library file, and the high level translated instructions in the object-code becoming functions in the dynamically linked library file which emulate the corresponding object-code instructions of the emulated computer.

7. The method according to claim 6, the functions in the dynamically linked library file being case statements in a programming language switch statement, and each case statement being addressed by its corresponding address in the object-code file of the emulated computer so as to allow both translated and unmodified object-code instructions to be executed by the same corresponding preprogrammed emulated functions provided on the host computer.

8. A non-transitory tangible computer readable carrier comprising instructions stored thereon, the instructions, when executed by a microprocessor of a host computer, allowing the host computer to emulate the functionality of an emulated computer by executing a plurality of object-code instructions for the emulated computer on the host computer, the instructions comprising:

identifying a plurality of preprogrammed emulation functions provided to the host computer, the preprogrammed emulation functions implementing individual instructions of the emulated computer on the host computer in an emulated operating environment of the emulated computer;

pre-parsing the object-code instructions prior to run-time, the pre-parsing comprising generating equivalent high level translated functions for any object-code instructions for which a corresponding preprogrammed emulation function does not exist and compiling the high level translated instruction into corresponding object-code instructions suitable for execution on the host computer;

executing the unmodified object-code instructions on the host computer by sequentially parsing each instruction and invoking a corresponding preprogrammed emulation function provided on the host computer; and, directly executing any object-code instructions produced during the pre-parsing.

9. The non-transitory tangible computer readable carrier of claim 8 further comprising instructions invoking an interrupt handler to process any pending interrupts.

10. The non-transitory tangible computer readable carrier of claim 8 further comprising instructions placing a mark in the object-code instructions produced during the pre-parsing, the mark identifying the object-code instructions as containing a translated instruction.

11. The non-transitory tangible computer readable carrier of claim 10, the instructions further comprising:
maintaining a first address pointing to an address of the next object-code when object-code having an unmodified instruction is executed;
maintaining an entry point address pointing to a next function to be executed when object-code having a translated instruction is executed; and,
translating between the entry point address and the first address in response to a transition between executing object-code having an unmodified instruction and executing object-code containing a translated instruction.

12. The non-transitory tangible computer readable carrier of claim 11, the instructions further comprising embedding the translated instructions in a library routine, wherein the library routine includes a switch statement that comprises a sequence of calls to ones of the functions corresponding to the object-code instructions and wherein the individual calls to the functions in the switch statement have addresses corresponding to the entry point address of the respective instruction in the corresponding plurality of object-code instructions.

13. The non-transitory tangible computer readable carrier of claim 12, the library routines being provided in a dynamically linked library file, and the high level translated instructions in the object-code becoming functions in the dynamically linked library file which emulate the corresponding object-code instructions of the emulated computer.

14. The non-transitory tangible computer readable carrier according to claim 13, the functions in the dynamically linked library file being case statements in a programming language switch statement, and each case statement being addressed by its corresponding address in the object-code file of the emulated computer so as to allow both translated and unmodified object-code instructions to be executed by the same corresponding preprogrammed emulated functions provided on the host computer.

15. A system for emulating the functionality of an emulated computer on a host computer by executing a plurality of object-code instructions for the emulated computer on the host computers the system comprising:
- at least one processor;
- at least one non-transitory computer readable carrier;
- instructions stored on the at least one non-transitory computer readable carrier which cause the processor to identify a plurality of preprogrammed emulation functions provided to the host computer, the preprogrammed emulation functions implementing individual instructions of the emulated computer on the host computer in an emulated operating environment of the emulated computer;
- instructions stored on the at least one non-transitory computer readable carrier which cause the processor to pre-parse the object-code instructions prior to run-time, the pre-parsing comprising generating equivalent high level translated functions for any object-code instructions for which a corresponding preprogrammed emulation function does not exist and compiling the high level translated instruction into corresponding object-code instructions suitable for execution on the host computer;
- instructions stored on the at least one non-transitory computer readable carrier which cause the processor to execute the unmodified object-code instructions on the host computer by sequentially parsing each instruction and invoking a corresponding preprogrammed emulation function provided on the host computer; and,
- instructions stored on the at least one non-transitory computer readable carrier which cause the processor to directly execute any object-code instructions produced during the pre-parsing.

16. The system of claim 15 further comprising instructions stored on the at least one non-transitory computer readable carrier which cause the processor to invoke an interrupt handler to process any pending interrupts.

17. The system of claim 15 further comprising instructions stored on the at least one non-transitory computer readable carrier which cause the processor to placing a mark in the object-code instructions produced during the pre-parsing, the mark identifying the object-code instructions as containing a translated instruction.

18. The system of claim 17, further comprising:
- instructions stored on the at least one non-transitory computer readable carrier which cause the processor to maintain a first address pointing to an address of the next object-code when object-code having an unmodified instruction is executed;
- instructions stored on the at least one non-transitory computer readable carrier which cause the processor to maintain an entry point address pointing to a next function to be executed when object-code having a translated instruction is executed; and,
- instructions stored on the at least one non-transitory computer readable carrier which cause the processor to translate between the entry point address and the first address in response to a transition between executing object-code having an unmodified instruction and executing object-code containing a translated instruction.

19. The system of claim 18, further comprising instructions stored on the at least one non-transitory computer readable carrier which cause the processor to embed the translated instructions in a library routine, the library routine including a switch statement that comprises a sequence of calls to ones of the functions corresponding to the object-code instructions and the individual calls to the functions in the switch statement having addresses corresponding to the entry point address of the respective instruction in the corresponding plurality of object-code instructions.

20. The system of claim 19, the library routines being provided in a dynamically linked library file, and the high level translated instructions in the object-code comprising functions in the dynamically linked library file which emulate the corresponding object-code instructions of the emulated computer.

21. The system according to claim 20, the functions in the dynamically linked library file being case statements in a programming language switch statement, and each case statement being addressed by its corresponding address in the object-code file of the emulated computer so as to allow both translated and unmodified object-code instructions to be executed by the same corresponding preprogrammed emulated functions provided on the host computer.

* * * * *